United States Patent
Kawamoto et al.

(10) Patent No.: US 11,721,493 B2
(45) Date of Patent: Aug. 8, 2023

(54) LIQUID DISPERSION COMPOSITION FOR SOLID ELECTROLYTIC CAPACITOR PRODUCTION

(71) Applicant: SHOWA DENKO K.K., Tokyo (JP)

(72) Inventors: Takeshi Kawamoto, Yokohama (JP); Takashi Okubo, Himeji (JP)

(73) Assignee: SHOWA DENKO K.K., Tokyo (JP)

( * ) Notice: Subject to any disclaimer, the term of this patent is extended or adjusted under 35 U.S.C. 154(b) by 47 days.

(21) Appl. No.: 16/956,824

(22) PCT Filed: Sep. 18, 2018

(86) PCT No.: PCT/JP2018/034347
§ 371 (c)(1),
(2) Date: Jun. 22, 2020

(87) PCT Pub. No.: WO2019/130677
PCT Pub. Date: Jul. 4, 2019

(65) Prior Publication Data
US 2020/0402721 A1    Dec. 24, 2020

(30) Foreign Application Priority Data
Dec. 25, 2017    (JP) .................................. 2017-248068

(51) Int. Cl.
| | | |
|---|---|---|
| H01G 9/15 | (2006.01) | |
| C08F 12/30 | (2006.01) | |
| C08K 5/45 | (2006.01) | |
| H01G 9/00 | (2006.01) | |
| H01G 9/048 | (2006.01) | |

(52) U.S. Cl.
CPC .............. H01G 9/15 (2013.01); C08F 12/30 (2013.01); C08K 5/45 (2013.01); H01G 9/0036 (2013.01); H01G 9/048 (2013.01)

(58) Field of Classification Search
CPC ........ H01G 9/0036; H01G 9/15; H01G 9/048; C08F 12/30; C08K 5/45
See application file for complete search history.

(56) References Cited

U.S. PATENT DOCUMENTS

| | | | | |
|---|---|---|---|---|
| 5,530,139 | A * | 6/1996 | Saida .................... | C07D 495/04 546/10 |
| 5,648,453 | A | 7/1997 | Saida et al. | |
| 7,842,758 | B2 * | 11/2010 | Therien ................ | C08G 61/123 548/134 |
| 8,721,928 | B2 | 5/2014 | Jonas et al. | |
| 9,640,325 | B2 | 5/2017 | Tagawa et al. | |
| 11,104,659 | B2 * | 8/2021 | Kawamoto .......... | C08G 61/126 |
| 11,183,340 | B2 * | 11/2021 | Kawamoto .......... | H01G 9/0032 |
| 2002/0034060 | A1 * | 3/2002 | Konuma ................ | H01G 9/025 361/326 |
| 2002/0039274 | A1 | 4/2002 | Konuma et al. | |
| 2005/0063922 | A1 * | 3/2005 | Reynolds ............... | A61K 6/889 433/217.1 |
| 2006/0057426 | A1 * | 3/2006 | Itoh ........................ | H05B 33/14 313/506 |
| 2010/0165546 | A1 | 7/2010 | Yoshida et al. | |

(Continued)

FOREIGN PATENT DOCUMENTS

| | | |
|---|---|---|
| CN | 101385105 A | 3/2009 |
| CN | 105143302 A | 12/2015 |
| EP | 1 988 128 A1 | 11/2008 |
| EP | 3 564 976 A1 | 11/2019 |
| JP | 6-49183 A | 2/1994 |
| JP | 10-120769 A | 5/1998 |
| JP | 2000-12394 A | 1/2000 |
| JP | 2003-100561 A | 4/2003 |

(Continued)

OTHER PUBLICATIONS

Communication dated Jul. 1, 2021 from the Chinese National Intellectual Property Administration in CN Machine Application No. 201880083649.0.

(Continued)

*Primary Examiner* — Scott B Geyer
(74) *Attorney, Agent, or Firm* — Sughrue Mion, PLLC

(57) ABSTRACT

A liquid dispersion composition for solid electrolytic capacitor production, containing a conjugated conductive polymer prepared by polymerizing a monomer compound in a dispersion medium containing seed particles with protective colloid formed of a polyanion or in a dispersion medium containing a polyanion, and a compound (a) represented by a general formula (1), where $R^1$ to $R^6$ and k are as defined in the description; and a method for producing a solid electrolytic capacitor, including a step of adhering the composition to a porous anode body made of a valve action metal having a dielectric coating film on the surface thereof, and a step of removing the dispersion medium from the liquid dispersion composition having adhered to the porous anode body to form a solid electrolyte layer

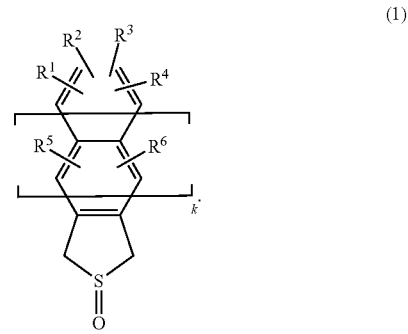

(1)

3 Claims, No Drawings

(56) References Cited

U.S. PATENT DOCUMENTS

| | | | |
|---|---|---|---|
| 2011/0003967 A1* | 1/2011 | Amb | C08G 61/122 |
| | | | 528/380 |
| 2011/0288253 A1* | 11/2011 | Reynolds | C09K 9/02 |
| | | | 526/240 |
| 2016/0024315 A1 | 1/2016 | Tagawa et al. | |
| 2017/0200569 A1* | 7/2017 | Naito | H01G 11/86 |
| 2018/0244838 A1 | 8/2018 | Miyamoto et al. | |

FOREIGN PATENT DOCUMENTS

| | | |
|---|---|---|
| JP | 2005-109252 A | 4/2005 |
| JP | 2007-204654 A | 8/2007 |
| JP | 2011-510141 A | 3/2011 |
| JP | 2016-207300 A | 12/2016 |
| TW | 201630917 A | 9/2016 |
| TW | 201704287 A | 2/2017 |
| WO | 2014/163202 A1 | 10/2014 |

OTHER PUBLICATIONS

International Search Report for PCT/JP2018/034347, dated Dec. 11, 2018.
Extended European Search Report dated Dec. 6, 2021 in European Application No. 18895784.9.
Communication dated Jul. 6, 2022 from the Taiwanese Patent Office in Taiwanese Application No. 107146766.

* cited by examiner

LIQUID DISPERSION COMPOSITION FOR SOLID ELECTROLYTIC CAPACITOR PRODUCTION

CROSS REFERENCE TO RELATED APPLICATIONS

This application is a National Stage of International Application No. PCT/JP2018/034347 filed Sep. 18, 2018, claiming priority based on Japanese Patent Application No. 2017-248068 filed Dec. 25, 2017.

TECHNICAL FIELD

The present invention relates to a method for producing a solid electrolytic capacitor, and to a liquid dispersion composition for solid electrolytic capacitor production for use for the production method.

BACKGROUND ART

Use of a conductive polymer as a solid electrolyte has been proposed for a solid electrolytic capacitor to be produced by forming a dielectric oxide coating film on a metal surface through anodic oxidation thereon and bringing it into contact with a solid electrolyte.

As examples of the metal covered with a dielectric oxide film through anodic oxidation, aluminum, tantalum, niobium, etc. are known.

As conductive polymers used for a solid electrolytic capacitor, conjugated conductive polymers such as polythiophene, polypyrrole, polyaniline, polyacetylene, polyphenylene, poly(p-phenylenevinylene), polyacene, polythiophenevinylene, and derivatives thereof are known. The technology to dope these conjugated conductive polymers with a poly anion such as polystyrene sulfonate as a counter anion is known.

Generally, a solid electrolyte is formed by chemically oxidizing and polymerizing or electropolymerizing a monomer solution for obtaining a conductive polymer and an oxidant solution on the dielectric oxide film formed on the surface of metal exhibiting valve action. In addition, another method of forming a solid electrolyte by applying a conductive polymer solution or suspension liquid to a metal surface has been proposed.

For example, PTL 1 discloses a manufacturing method including the steps of forming a first solid electrolyte layer by impregnating a capacitor element with a conductive polymer dispersion solution in which conductive polymer particles are dispersed; and forming a second solid electrolyte layer by impregnating the surface of this first solid electrolyte layer with a solution containing a heterocyclic monomer and then a solution containing an oxidant or with a mixed solution containing a heterocyclic monomer and an oxidant.

PTL 2 discloses a manufacturing method including the steps of: forming a conductive polymer layer as a solid electrolyte layer on a capacitor element in which a dielectric oxide film is formed on the surface of a sintered body formed by sintering valve metal powders, by chemically polymerizing a polymerizable monomer; immersing this capacitor element in a conductive polymer solution or applying a conductive polymer solution to this capacitor element; drying this capacitor element; and forming another conductive polymer layer on the conductive polymer layer formed by the chemical polymerization.

PTL 3 proposes a process of lowering the viscosity of a poly (3,4-ethylenedioxythiophene)-polystyrenesulfonate (PEDOT-PSS) liquid dispersion and polymerizing it under ultrasonic irradiation for infiltrating the resultant conductive polymer into the inside of a capacitor.

PTL 4 shows a method of producing a solid electrolytic capacitor excellent in capacitor performance with a good productivity, which includes a step of polymerizing a monomer in a dispersion medium containing a monomer for producing a conjugated conductive polymer and seed particles in the form of a protective colloid with a polyanion to give a conjugated conductive polymer-containing liquid dispersion, and shows a solid electrolytic capacitor. Using a conductive polymer, the solid electrolytic capacitor is characterized by low equivalent series resistance (ESR), excellent frequency performance and small performance change relative to temperature change.

CITATION LIST

Patent Literature

PTL 1: JP 2003-100561 A
PTL 2: JP 2005-109252 A
PTL 3: JP 2011-510141 A (U.S. Pat. No. 8,721,928)
PTL 4: WO 2014/163202 (U.S. Pat. No. 9,640,325)

SUMMARY OF INVENTION

Technical Problem

Accordingly, an object of the present invention is to provide a method for producing a solid electrolytic capacitor capable of readily forming a solid electrolyte layer therein and having a high capacitance incidence ratio (electrostatic capacitance), and to produce a liquid dispersion composition for forming a solid electrolyte layer for use in the above-mentioned method (abbreviated as "a liquid dispersion composition for solid electrolytic capacitor production").

Solution to Problem

As the result of their extensive studies, the inventors have found that, when a liquid dispersion composition containing a conjugated conductive polymer and a condensed polycyclic compound monomer having a specific structure (a liquid dispersion composition for solid electrolytic capacitor production) is adhered to a porous anode body made of a valve metal having a dielectric coating film on the surface thereof, then the dispersion medium is removed and the condensed polycyclic compound monomer is polymerized to form a solid electrolyte layer, the above-mentioned problems can be solved.

Specifically, the present invention relates to a liquid dispersion composition for solid electrolytic capacitor production of the following [1] to [6], and a method for producing a solid electrolytic capacitor of [7] to [15].

[1] A liquid dispersion composition for solid electrolytic capacitor production, containing a conjugated conductive polymer, a dispersion medium, and a compound (a) represented by a general formula (1):

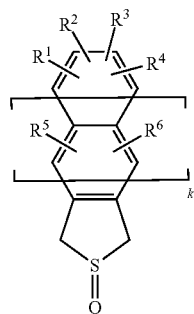

wherein $R^1$, $R^2$, $R^3$, $R^4$, $R^5$ and $R^6$ each independently represent a monovalent substituent selected from the group consisting of (1) a hydrogen atom, (2-1) a linear or branched alkyl group having 1 to 20 carbon atoms, (2-2) a linear or branched alkoxy group having 1 to 20 carbon atoms, (2-3) a linear or branched alkylcarbonyloxy group having 1 to 20 carbon atoms, (3) —$SO_2M$ (M represents OH, or an alkali metal alkoxide selected from $O^-Na^+$, $O^-Li^+$ and $O^-K^+$, an ammonium alkoxide represented by $O^-NH_4^+$, a linear or branched alkoxy group having 1 to 20 carbon atoms, or a halogen atom selected from chlorine, fluorine, bromine or iodine), (4) a halogen atom, (5) a carboxy group, (6) a phosphonyl group, (7) a nitro group, (8) a cyano group, (9) a primary, secondary or tertiary amino group, (10) a trihalomethyl group, (11) a phenyl group, and (12) a phenyl group substituted with at least one selected from the group consisting of an alkyl group a hydroxy group, an alkoxy group, an alkylcarbonyloxy group, a sulfo group and a halogen atom; with respect to the substituents represented by $R^1$, $R^2$, $R^3$, $R^4$, $R^5$ and $R^6$, the hydrocarbon chain in one of the substituents may bond to the hydrocarbon chain in the other substituent at any arbitrary position to form at least one divalent chain that forms at least one, 3 to 7-membered, saturated or unsaturated cyclic structure along with the carbon atoms to which the substituents bond; the alkyl group, the alkoxy group, or the alkylcarbonyloxy group, which is represented by $R^1$, $R^2$, $R^3$, $R^4$, $R^5$ or $R^6$, or a cyclic hydrocarbon chain formed therefrom may contain at least one bond selected from carbonyl, ether, ester, amide, sulfide, sulfinyl, sulfonyl and imino; k represents a number of condensed rings surrounded by the hetero ring and the benzene ring having substituents $R^1$ to $R^4$, and is an integer of 0 to 3.

[2] The liquid dispersion composition for solid electrolytic capacitor production according to the above 1, wherein $R^1$, $R^2$, $R^3$, $R^4$, $R^5$ and $R^6$ in the general formula (1) each independently represent a monovalent substituent selected from (1) a hydrogen atom, (2-1) a linear or branched alkyl group having 1 to 20 carbon atoms, (2-2) a linear or branched alkoxy group having 1 to 20 carbon atoms, (2-3) a linear or branched alkylcarbonyloxy group having 1 to 20 carbon atoms, (3) —$SO_2M$, and (4) a halogen atom.

[3] The liquid dispersion composition for solid electrolytic capacitor production according to the above 1 or 2, wherein the compound (a) is at least one of a compound (a1) of the general formula (1) where $R^1$, $R^2$, $R^3$, $R^4$, $R^5$ and $R^6$ each independently represent a monovalent substituent selected from (1) a hydrogen atom, (2-1) a linear or branched alkyl group having 1 to 20 carbon atoms, (2-2) a linear or branched alkoxy group having 1 to 20 carbon atoms, (2-3) a linear or branched alkylcarbonyloxy group having 1 to 20 carbon atoms, and (4) a halogen atom, and a compound (a2) of the general formula (1) where $R^1$ is (3) —$SO_2M$.

[4] The liquid dispersion composition for solid electrolytic capacitor production according to any of the above 1 to 3, wherein the compound (a) is a compound of the general formula (1) where k is 0.

[5] The liquid dispersion composition for solid electrolytic capacitor production according to any of the above 1 to 4, wherein the conjugated conductive polymer is a polymer of a monomer compound represented by a formula (2):

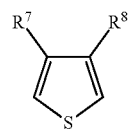

wherein $R^7$ and $R^8$ each independently represent a hydrogen atom, a hydroxy group, an alkyl group with 1 to 18 carbon atoms optionally having a substituent, an alkoxy group with 1 to 18 carbon atoms optionally having a substituent, or an alkylthio group with 1 to 18 carbon atoms optionally having a substituent, or $R^7$ and $R^8$ bond to each other to form an alicycle with 3 to 10 carbon atoms optionally having a substituent, an aromatic ring with 6 to 10 carbon atoms optionally having a substituent, an oxygen-containing hetero ring with 2 to 10 carbon atoms optionally having a substituent, a sulfur atom-containing hetero ring with 2 to 10 carbon atoms optionally having a substituent, or a sulfur atom and oxygen atom-containing hetero ring with 2 to 10 carbon atoms optionally having a substituent.

[6] The liquid dispersion composition for solid electrolytic capacitor production according to any of the above 1 to 5, further containing a polyanion.

[7] A method for producing a solid electrolytic capacitor, including a step (step C1) of adhering the liquid dispersion composition for solid electrolytic capacitor production of any of the above 1 to 6, to a porous anode body made of a valve metal having a dielectric coating film on the surface thereof, and a step (step D1) of removing the dispersion medium from the liquid dispersion composition having adhered to the porous anode body to form a solid electrolyte layer.

[8] A method for producing a solid electrolytic capacitor, including:

a step (step A) of preparing a conjugated conductive polymer-containing liquid dispersion (i) by polymerizing a monomer compound in a dispersion medium containing seed particles with protective colloid formed of a polyanion or in a dispersion medium containing a polyanion, a step (step B) of adding a compound (a) represented by a general formula (1):

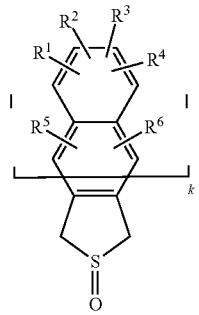

wherein the symbols have the same meanings as in the above 1, to the conjugated conductive polymer-containing liquid dispersion (i) to prepare a dispersion (ii) containing the compound (a) and the conjugated conductive polymer, a step (step C2) of adhering the dispersion (ii) to a porous anode body formed of a valve metal having a dielectric coating film on the surface thereof, and a step (step D2) of removing the dispersion medium from the liquid dispersion (ii) having adhered to the porous anode body to form a solid electrolyte layer.

[9] The method for producing a solid electrolytic capacitor according to the above 8, wherein $R^1$, $R^2$, $R^3$, $R^4$, $R^5$ and $R^6$ in the general formula (1) each independently represent a monovalent substituent selected from (1) a hydrogen atom, (2-1) a linear or branched alkyl group having 1 to 20 carbon atoms, (2-2) a linear or branched alkoxy group having 1 to 20 carbon atoms, (2-3) a linear or branched alkylcarbonyloxy group having 1 to 20 carbon atoms, (3) —$SO_2M$, and (4) a halogen atom.

[10] The method for producing a solid electrolytic capacitor according to the above 8 or 9, wherein the compound (a) is at least one of a compound (a1) of the general formula (1) where $R^1$, $R^2$, $R^3$, $R^4$, $R^5$ and $R^6$ each independently represent a monovalent substituent selected from (1) a hydrogen atom, (2-1) a linear or branched alkyl group having 1 to 20 carbon atoms, (2-2) a linear or branched alkoxy group having 1 to 20 carbon atoms, (2-3) a linear or branched alkylcarbonyloxy group having 1 to 20 carbon atoms, and (4) a halogen atom, and a compound (a2) of the general formula (1) where $R^1$ is –$SO_2M$.

[11] The method for producing a solid electrolytic capacitor according to any of the above 8 to 10, wherein the compound (a) is a compound of the general formula (1) where k is 0.

[12] The method for producing a solid electrolytic capacitor according to any of the above 8 to 11, wherein the seed particle is a particle of a polymer of an ethylenically unsaturated monomer.

[13] The method for producing a solid electrolytic capacitor according to any of the above 8 to 12, wherein the particle size d50 of the seed particle with protective colloid formed of a polyanion is 0.01 to 10 μm.

[14] The method for producing a solid electrolytic capacitor according to any of the above 8 to 13, wherein the polyanion is a polymer having a sulfo group.

[15] The method for producing a solid electrolytic capacitor according to any of the above 8 to 14, wherein the proportion of the anion group in the polyanion is 0.25 to 30 mol relative to 1 mol of the monomer compound.

Advantageous Effects of Invention

By adhering a liquid dispersion composition (a liquid dispersion composition for solid electrolytic capacitor production) that contains a conjugated conductive polymer and a condensed polycyclic compound monomer represented by the general formula (1) to a porous anode body made of a valve metal having a dielectric coating film on the surface thereof, and then removing the dispersion medium to polymerize the condensed polycyclic compound to form a solid electrolyte layer, a solid electrolytic capacitor having a high capacitance incidence ratio (electrostatic capacitance) can be produced.

DESCRIPTION OF EMBODIMENTS

The liquid dispersion composition for solid electrolytic capacitor production of the first aspect of the present invention is a liquid dispersion composition containing a conjugated conductive polymer, a dispersion medium, and a compound (a) represented by a general formula (1):

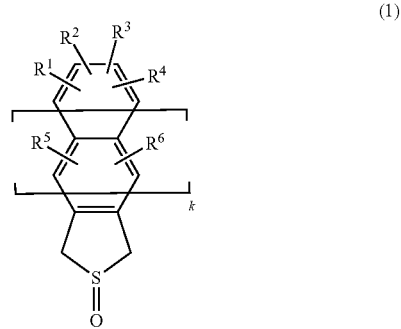

wherein $R^1$, $R^2$, $R^3$, $R^4$, $R^5$ and $R^6$ each independently represent a monovalent substituent selected from the group consisting of (1) a hydrogen atom, (2-1) a linear or branched alkyl group having 1 to 20 carbon atoms, (2-2) a linear or branched alkoxy group having 1 to 20 carbon atoms, (2-3) a linear or branched alkylcarbonyloxy group having 1 to 20 carbon atoms, (3) —$SO_2M$ (M represents OH, or an alkali metal alkoxide selected from $O^-Na^+$, $O^-Li^+$ and $O^-K^+$, an ammonium alkoxide represented by $O^-NH_4^+$, a linear or branched alkoxy group having 1 to 20 carbon atoms, or a halogen atom selected from chlorine, fluorine, bromine or iodine), (4) a halogen atom, (5) a carboxy group, (6) a phosphonyl group, (7) a nitro group, (8) a cyano group, (9) a primary, secondary or tertiary amino group, (10) a trihalomethyl group, (11) a phenyl group, and (12) a phenyl group substituted with at least one selected from the group consisting of an alkyl group a hydroxy group, an alkoxy group, an alkylcarbonyloxy group, a sulfo group and a halogen atom; with respect to the substituents represented by $R^1$, $R^2$, $R^3$, $R^4$, $R^5$ and $R^6$, the hydrocarbon chain in one of the substituents may bond to the hydrocarbon chain in the other substituent at any arbitrary position to form at least one divalent chain that forms at least one, 3 to 7-membered, saturated or unsaturated cyclic structure along with the carbon atoms to which the substituents bond; the alkyl group, the alkoxy group, or the alkylcarbonyloxy group, which is represented by $R^1$, $R^2$, $R^3$, $R^4$, $R^5$ or $R^6$, or a cyclic hydrocarbon chain formed therefrom may contain at least one bond selected from carbonyl, ether, ester, amide, sulfide, sulfinyl, sulfonyl and imino; k represents a number of the condensed rings surrounded by the hetero ring and the benzene ring having substituents $R^1$ to $R^4$, and is an integer of 0 to 3.

A method for producing a solid electrolytic capacitor of the second aspect of the present invention includes a step (step C1) of adhering the liquid dispersion composition for solid electrolytic capacitor production of the first aspect of the invention, to a porous anode body made of a valve metal having a dielectric coating film on the surface thereof, and a step (step D1) of removing the dispersion medium from the liquid dispersion composition having adhered to the porous anode body to form a solid electrolyte layer.

A method for producing a solid electrolytic capacitor of the third aspect of the present invention includes a step (step A) of preparing a conjugated conductive polymer-containing liquid dispersion (i) by polymerizing a monomer compound in a dispersion medium containing seed particles with protective colloid formed of a polyanion or in a dispersion medium containing a polyanion, a step (step B) of adding the above-mentioned compound (a) to the conjugated conductive polymer-containing liquid dispersion (i) to prepare a dispersion (ii) containing the compound (a) and the conjugated conductive polymer, a step (step C2) of adhering the dispersion (ii) to a porous anode body formed of a valve metal having a dielectric coating film on the surface thereof, and a step (step D2) of removing the dispersion medium from the liquid dispersion (ii) having adhered to the porous anode body to form a solid electrolyte layer.

In this description, both a conjugated conductive polymer produced by homopolymerizing a monomer compound and a conjugated conductive copolymer produced by copolymerizing plural monomer compounds are together referred to as "a conjugated conductive polymer".

In this description, "(meth)acryl" indicates acryl or methacryl, and "(meth)acrylate" indicates acrylate or methacrylate.

A particle in a state where a polyanion has adhered to the surface of a seed particle as coordinate therewith to form a protective colloid is referred to as "a seed particle with protective colloid formed of a polyanion". A polyanion means a polymer having 2 or more anionic groups.

<First Aspect of Invention: Liquid Dispersion Composition for Solid Electrolytic Capacitor Production>

Hereinunder the liquid dispersion composition for solid electrolytic capacitor production is described.

The dispersion composition for solid electrolytic capacitor production of the first aspect of the present invention contains a conjugated conductive polymer, a dispersion medium and a compound (a) mentioned below.

The compound (a) transfers to a monomer having a higher activity through transfer reaction and dehydration reaction with an electrophilic agent, and therefore by removing the dispersion medium from the liquid dispersion composition for solid electrolytic capacitor production of the first aspect of the invention, a solid electrolyte layer containing a polymer of the compound (a) and a conjugated conductive polymer can be formed with ease.

A method for producing the liquid dispersion composition for solid electrolytic capacitor production of the first aspect of the invention is not specifically limited, but preferably the liquid dispersion composition is prepared according to the step (B) in the third aspect of the invention as mentioned below.

[1-1. Monomer Compound]

The monomer compound to be a structural unit of the conjugated conductive polymer is preferably one or more selected from a pyrrole optionally having a substituent, an aniline optionally having a substituent, and a thiophene optionally having a substituent. Examples of the substituent includes an alkyl group having 1 to 18 carbon atoms, an aryl group having 6 to 10 carbon atoms, a heteroaryl group having 5 to 10 carbon atoms, an alkoxy group having 1 to 18 carbon atoms, an alkylthio group having 1 to 18 carbon atoms, a carboxy group, a hydroxy group, a halogen atom, and a cyano group. The alkyl group, the aryl group, the heteroaryl group, the alkoxy group and the alkylthio group may be substituted with one or more selected from a carboxy group, a hydroxy group, a halogen atom or a cyano group. Two or more of the substituents may be condensed to form a ring.

Specific examples of the monomer compound include pyrrole, N-methylpyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxypyrrole, 3-methyl-4-carboxypyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole;

thiophene, 3-methylthiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butylenedioxythiophene, 3-methyl-4-methoxythiophene, 3-methyl-4-ethoxythiophene, 3-carboxythiophene, 3-methyl-4-carboxythiophene, 3-methyl-4-carboxyethylthiophene, 3-methyl-4-carboxybutylthiophene, and 3,4-ethyleneoxythiathiophene;

aniline, 2-methylaniline, 3-isobutylaniline, 2-anilinesulfonic acid, and 3-anilinesulfonic acid.

One alone or two or more kinds of the monomer compounds may be used either singly or as combined.

Among the monomer compounds, compounds represented by the following formula (2) are preferred, compounds represented by the following formula (3) are more preferred, and 3,4-ethylenedioxythiophene is even more preferred.

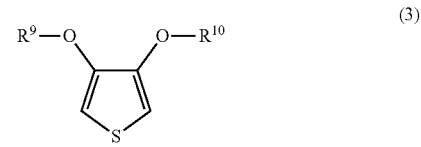

In the formula (2), $R^7$ and $R^8$ each independently represent a hydrogen atom, a hydroxy group, an alkyl group with 1 to 18 carbon atoms optionally having a substituent, an alkoxy group with 1 to 18 carbon atoms optionally having a substituent, or an alkylthio group with 1 to 18 carbon atoms optionally having a substituent, or $R^7$ and $R^8$ bond to each other to form a ring, representing an alicycle with 3 to 10 carbon atoms optionally having a substituent, an aromatic ring with 6 to 10 carbon atoms optionally having a substituent, an oxygen-containing hetero ring with 2 to 10 carbon atoms optionally having a substituent, a sulfur atom-containing hetero ring with 2 to 10 carbon atoms optionally having a substituent, or a sulfur atom and oxygen atom-containing hetero ring with 2 to 10 carbon atoms optionally having a substituent. Examples of the substituent include an alkyl group with 1 to 18 carbon atoms, an aryl group with 6 to 10 carbon atoms, a heteroaryl group with 5 to 10 carbon atoms, an alkoxy group with 1 to 18 carbon atoms, an alkylthio group with 1 to 18 carbon atoms, a carboxy group, a hydroxy group, a halogen atom, and a cyano group. The alkyl group, the aryl group, the heteroaryl group, the alkoxy group, and the alkylthio group may be substituted with a carboxy group, a hydroxy group, a halogen atom, or a cyano group. Furthermore, two or more substituents may be condensed to form a ring.

Examples of the above-mentioned oxygen atom-containing hetero ring include an oxirane ring, an oxetane ring, a furan ring, a hydrofuran ring, a pyran ring, a pyrone ring, a dioxane ring, and a trioxane ring.

Examples of the above-mentioned sulfur atom-containing hetero ring include a thiirane ring, a thietane ring, a thiophene ring, a thiane ring, a thiopyran ring, a thiopyrylium ring, a benzothiopyran ring, a dithiane ring, a dithiolane ring, and a trithiane ring.

Examples of the above-mentioned oxygen and sulfur atom-containing hetero ring include an oxathiolane ring and an oxathiane ring.

In the formula (3), $R^9$ and $R^{10}$ each independently represent a hydrogen atom, or an alkyl group with 1 to 4 carbon atoms optionally having a substituent, or $R^9$ and $R^{10}$ bond to each other to form a ring, representing an oxygen atom-containing hetero ring with 3 to 6 carbon atoms optionally having a substituent.

Preferably, $R^9$ and $R^{10}$ bond to each other to form a ring, representing an oxygen atom-containing hetero ring with 3 to 6 carbon atoms optionally having a substituent. The oxygen atom-containing hetero ring includes a dioxane ring and a trioxane ring, and a dioxane ring is preferred. Examples of the substituent include an alkyl group with 1 to 18 carbon atoms, an aryl group with 6 to 10 carbon atoms, a heteroaryl group with 5 to 10 carbon atoms, an alkoxy group with 1 to 18 carbon atoms, an alkylthio group with 1 to 18 carbon atoms, a carboxy group, a hydroxy group, a halogen atom and a cyano group. The alkyl group, the aryl group, the heteroaryl group, the alkoxy group, and the alkylthio group may be substituted with a carboxy group, a hydroxy group, a halogen atom, or a cyano group. Furthermore, two or more substituents may be condensed to form a ring.

[1-2. Conjugated Conductive Polymer]

The conjugated conductive polymer that is prepared by polymerizing a monomer for producing the conjugated conductive polymer is not specifically limited as long as being an organic polymer compound with a π conjugated system in the main chain. Examples of the conjugated conductive polymer include polypyrroles, polythiophenes, polyisothianaphthenes, polyacetylenes, polyphenylenes, polyphenylenevinylenes, polyanilines, polyacenes, polythiophenevinylenes, and copolymers thereof.

Among these conjugated conductive polymers, polypyrrole, polythiophene, poly(N-methylpyrrole), poly(3-methylthiophene), poly(3-methoxythiophene) and (3,4-ethylenedioxythiophene) are preferred. In particular, as having higher conductivity and excellent in heat resistance, poly (3,4-ethylenedioxythiophene) (PEDOT) is more preferred.

One alone or two or more kinds of these conjugated conductive polymers may be used either singly or as combined.

[1-3. Dispersion Medium]

The dispersion medium for dispersing the conjugated conductive polymer is not specifically limited as long as being able to disperse the conjugated conductive polymer and being able to dissolve or disperse the compound (a).

Examples of the dispersion medium include water; amides such as N-vinylpyrrolidone, hexamethylphosphortriamide, N-vinylformamide, and N-vinylacetamide; phenols such as cresol, phenol, and xylenol; polyvalent alcohols such as dipropylene glycol, 1,3-butylene glycol, 1,4-butylene glycol, diglycerin, isoprene glycol, butanediol, 1,5-pentanediol, 1,6-hexanediol, 1,9-nonanediol, and neopentyl glycol; carbonate compounds such as ethylene carbonate and propylene carbonate; ethers such as dioxane, diethyl ether, propylene glycol dialkyl ether, polyethylene glycol dialkyl ether, and polypropylene glycol dialkyl ether; a heterocyclic compound such as 3-methyl-2-oxazolidinone; and nitriles such as acetonitrile, glutarodinitrile, methoxyacetonitrile, propionitrile, and benzonitrile. The dispersion medium can be used one kind alone or in combination with two or more kinds. The dispersion medium contains preferably 1.0 to 99.0 mass %, more preferably 50.0 to 99.0 mass % of water. Yet more preferably, water is used alone for the dispersion medium.

The amount to be used of the dispersion medium is preferably 10 to 50000 parts by mass, more preferably 50 to 10000 parts by mass, based on 100 parts by mass of the total amount of the conjugated conductive polymer, the compound (a) and any other optional nonvolatile component. When the amount of the dispersion medium is 10 parts by mass or more, the viscosity is suitable, and when it is 50000 parts by mass or less, the performance of the solid electrolytic capacitor is good.

[1-4. Compound (a)]

The compound (a) for use in the present invention is a compound represented by the general formula (1):

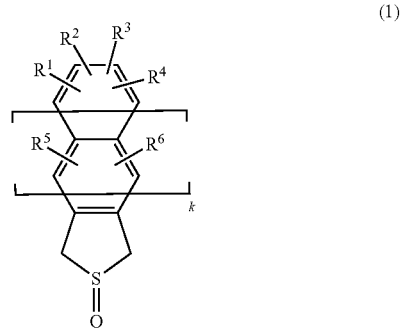

(1)

One alone or two or more kinds of the compound (a) may be used either singly or as combined.

In the general formula (1), $R^1$, $R^2$, $R^3$, $R^4$, $R^5$ and $R^6$ each independently represent a monovalent substituent selected from the group consisting of (1) a hydrogen atom, (2-1) a linear or branched alkyl group having 1 to 20 carbon atoms, (2-2) a linear or branched alkoxy group having 1 to 20 carbon atoms, (2-3) a linear or branched alkylcarbonyloxy group having 1 to 20 carbon atoms, (3) —$SO_2M$ (M represents OH, or an alkali metal alkoxide selected from $O^-Na^+$, $O^-Li^+$ and $O^-K^+$, an ammonium alkoxide represented by $O^-NH_4^+$, a linear or branched alkoxy group having 1 to 20 carbon atoms, or a halogen atom selected from chlorine, fluorine, bromine or iodine), (4) a halogen atom, (5) a carboxy group, (6) a phosphonyl group, (7) a nitro group, (8) a cyano group, (9) a primary, secondary or tertiary amino group, (10) a trihalomethyl group, (11) a phenyl group, and (12) a phenyl group substituted with at least one selected from the group consisting of an alkyl group a hydroxy group, an alkoxy group, an alkylcarbonyloxy group, a sulfo group and a halogen atom.

Useful examples for the substituents $R^1$, $R^2$, $R^3$, $R^4$, $R^5$ and $R^6$ include a hydrogen atom, a halogen atom, —$SO_2M$, a linear or branched alkyl group with 1 to 20 carbon atoms, a linear or branched alkoxy group with 1 to 20 carbon atoms, a linear or branched alkylcarbonyloxy group with 1 to 20 carbon atoms, a nitro group, and a cyano group.

These substituents are exemplified in more detail. The halogen atom includes fluorine, chlorine, bromine and iodine. The hydrocarbon chain of the alkyl group or the alkylcarbonyloxy group includes methyl, ethyl, propyl, isopropyl, n-butyl, isobutyl, t-butyl, pentyl, hexyl, octyl, dodecyl, tetradecyl, cyclopentyl and cyclohexyl. The alkoxy group includes methoxy, ethoxy, (2-methoxy)ethoxy, propoxy, isopropoxy, hexyloxy, octyloxy, and dodecyloxy groups. Examples of the alkylcarbonyloxy group include a malonate (—$OCOCH_2CO_2H$), a fumarate (—OCOCH=$CHCO_2H$ with a trans double bond), and a maleate (—OCOCH=$CHCO_2H$ with a cis double bond). The alkyl in the alkylcarbonyloxy group includes methyl, ethyl, n-propyl, isopropyl, n-butyl, isobutyl, t-butyl, pentyl, hexyl, octyl, dodecyl, tetradecyl, cyclopentyl, and cyclohexyl.

Other examples of the substituents than those mentioned above include an amino group such as methylamino, ethylamino, diphenylamino, and anilino, and other groups of trifluoromethyl, chlorophenyl, and acetamide.

The hydrocarbon chains in the substituents represented by $R^1$, $R^2$, $R^3$, $R^4$, $R^5$ and $R^6$ may bond to each other at any arbitrary position to form, along with the carbon atoms to which the substituents bond, at least one divalent chain that forms at least one, 3 to 7-membered, saturated or unsaturated cyclic structure.

The alkyl group, the alkoxy group, or the alkylcarbonyloxy group represented by $R^1$, $R^2$, $R^3$, $R^4$, $R^5$ and $R^6$, or the cyclic hydrocarbon chain formed therefrom may contain at least one bond selected from carbonyl, ether, ester, amide, sulfide, sulfinyl, sulfonyl and imino.

Examples of the cyclic structure of a 3 to 7-membered, saturated or unsaturated hydrocarbon to be formed by the hydrocarbon chains of the substituents $R^1$, $R^2$, $R^3$, $R^4$, $R^5$ and $R^6$ in the general formula (1) that bond to each other at any arbitrary position includes structures of the following formulae (4) and (5).

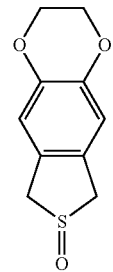

(4)

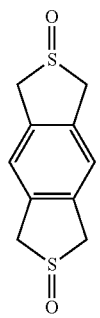

(5)

k represents a number of the condensed rings surrounded by the 1,3-dihydrothiophene-S-oxide ring and the benzene ring having the substituents $R^1$ to $R^4$ in the general formula (1), and represents an integer of 0 to 3. From the viewpoint of solubility in solvent, k is preferably 0.

Specific examples of the basic skeleton moiety excluding the substituents $R^1$ to $R^6$ in the compound represented by the general formula (1) include 1,3-dihydroisothianaphthene-S-oxide (compound where k is 0).

At least one selected from benzo[c]thiophene-1,3-dihydro-2-oxide and naphtho[2,3-c]thiophene-1,3-dihydro-2-oxide optionally having a substituent is preferably used as the compound represented by the general formula (1).

The general formula (1) representing the compound (a) include compounds represented by the following general formula (1-2).

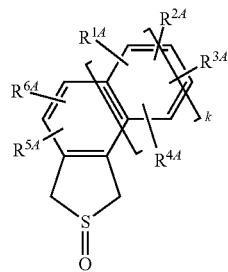

(1-2)

In the general formula (1-2), $R^{1A}$, $R^{2A}$, $R^{3A}$, $R^{4A}$, $R^{5A}$, $R^{6A}$ and k have the same meanings as those of $R^1$, $R^2$, $R^3$, $R^4$, $R^5$, $R^6$ and k, respectively, in the general formula (1). Specifically, a structure of the following formula (6) is mentioned.

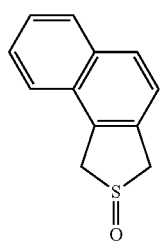

(6)

Compound (a1):

In the present invention, the compound (a) preferably includes a compound (a1) of the general formula (1) where $R^1$, $R^2$, $R^3$, $R^4$, $R^5$ and $R^6$ each independently represent a monovalent substituent selected from (1) a hydrogen atom, (2-1) a linear or branched alkyl group having 1 to 20 carbon atoms, (2-2) a linear or branched alkoxy group having 1 to 20 carbon atoms, (2-3) a linear or branched alkylcarbonyloxy group having 1 to 20 carbon atoms, and (4) a halogen atom.

Examples of the compound include benzo[c]thiophene-1,3-dihydro-2-oxide, benzo[c]thiophene-1,3-dihydro-5-methyl-2-oxide, benzo[c]thiophene-1,3-dihydro-5,6-dimethyl-2-oxide, benzo[c]thiophene-1,3-dihydro-5-methanol-2-oxide, benzo[c]thiophene-1,3-dihydro-5-hydroxy-2-oxide, benzo[c]thiophene-1,3-dihydro-5-fluoro-2-oxide, benzo[c]thiophene-1,3-dihydro-5-chloro-2-oxide, benzo[c]thiophene-1,3-dihydro-5-bromo-2-oxide, benzo[c]thiophene-1,3-dihydro-5-ol-2-oxide, naphtho[2,3-c]thiophene-1,3-dihydro-2-oxide, and naphtho[2,3-c]thiophene-1,3-dihydro-4-phenyl-2-oxide, but are not limited to these.

More preferably, $R^5$ and $R^6$ are hydrogen atoms.

More preferably, at least two of four $R^1$, $R^2$, $R^3$ and $R^4$ are hydrogen atoms, even more preferably at least three are hydrogen atoms, and especially preferably all are hydrogen atoms.

Compound (a2):

In another embodiment of the present invention, the compound (a) preferably includes a compound (a2) of the general formula (1) where $R^1$ is (3) —SO$_2$M.

Specifically, examples of the compound include benzo[c]thiophene-1,3-dihydro-2-oxide-4-sulfonic acid, benzo[c]thiophene-1,3-dihydro-2-oxide-5-sulfonic acid, benzo[c]thiophene-1,3-dihydro-2-oxide-5,6-disulfonic acid, benzo[c]thiophene-1,3-dihydro-2-oxide-4,5-disulfonic acid, benzo[c]thiophene-1,3-dihydro-2-oxide-4,6-disulfonic acid, and benzo[c]thiophene-1,3-dihydro-2-oxide-4,7-disulfonic acid, but are not limited to these.

$R^5$ and $R^6$ in the general formula (1) are more preferably hydrogen atoms.

More preferably, at least one of three $R^2$, $R^3$ and $R^4$ in the general formula (1) is a hydrogen atom, even more preferably at least two are hydrogen atoms, and especially preferably all are hydrogen atoms.

The amount of the compound (a) to be added to the liquid dispersion composition for solid electrolytic capacitor production is preferably 0.1 to 500 parts by mass relative to 100 parts by mass of the conjugated conductive polymer, more preferably 0.5 to 200 parts by mass, even more preferably 1 to 100 parts by mass. When the amount is 0.1 parts by mass or more, the capacitance incidence ratio of the solid electrolytic capacitor that is an advantageous effect of the present invention can increase. When the amount is 500 parts by mass or less, a good solid electrolyte can be formed.

The blending ratio of the compound (a1) and the compound (a2) to be added to the liquid dispersion composition for solid electrolytic capacitor production of the present invention is any arbitrary ratio.

[1-5. Polyanion]

As needed, a polyanion may be added to the liquid dispersion composition for solid electrolytic capacitor production.

The polyanion is a polymer having 2 or more anionic groups, coordinates with the surface of a seed particle to form a protective colloid thereon, and functions as a dopant for the conjugated conductive polymer.

Examples of the anionic group include a group of a sulfonic acid or a salt thereof, a group of a phosphoric acid or a salt thereof, a mono-substituted phosphate group, a group of a carboxylic acid or a salt thereof, and a mono-substituted sulfate group. Among these, strong acidic groups are preferred; a group of a sulfonic acid or a salt thereof, and a group of a phosphoric acid or a salt thereof are more preferred; and a group of a sulfonic acid or a salt thereof is even more preferred.

The anionic group may directly bond to the main chain of the polymer, or may bond to the side chain thereof. The anionic group bonding to the side chain can express a doping effect more remarkably, and therefore the anionic group preferably bonds to the end of the side chain.

The polyanion may have a substituent other than the anionic group. Examples of such a substituent include an alkyl group, a hydroxy group, an alkoxy group, a phenol group, a cyano group, a phenyl group, a hydroxyphenyl group, an ester group, a halogeno group, an alkenyl group, an imide group, an amide group, an amino group, an oxycarbonyl group, and a carbonyl group. Among these, an alkyl group, a hydroxy group, a cyano group, a phenol group, and an oxycarbonyl group are preferable, and an alkyl group, a hydroxy group, and a cyano group are more preferable. The substituent may directly bond to the polymer main chain or the side chains. Preferably, the substituent bonds to the side-chain ends to produce their own action.

The alkyl group as a substituent in the polyanion has a promising effect in enhancing the solubility and the dispersibility of a polyanion in a dispersion medium and the compatibility with and the dispersibility in the conjugated conductive polymer. Examples of the alkyl groups include linear alkyl groups such as a methyl group, an ethyl group, a propyl group, a butyl group, an isobutyl group, a t-butyl group, a pentyl group, a hexyl group, an octyl group, a decyl group, and a dodecyl group; and cycloalkyl groups such as a cyclopropyl group, a cyclopentyl group, and a cyclohexyl group. In consideration of the solubility in a dispersion medium, the dispersibility in the conjugated conductive polymer, the steric hindrance, etc., alkyl groups with from 1 to 12 carbon atoms are more preferable.

The hydroxy group as a substituent in the polyanion easily form a hydrogen bond with other hydrogen atoms, etc. and have a promising effect in enhancing the dispersibility of the polyanion in a dispersion medium and the compatibility with, the dispersibility in, and the adhesiveness to the conjugated conductive polymer. The hydroxy groups bonding to the ends of C1 to C6 alkyl groups bonding to the polymer main chain are preferable.

The cyano group and the hydroxyphenyl group as substituents in the polyanion have a promising effect in enhancing the dispersibility of the polyanion in a dispersion medium and the compatibility with the conjugated conductive polymer, and the heat resistance. The cyano groups directly bonding to the polymer main chain or bonding to the ends of C1 to C7 alkyl groups or C2 to C7 alkenyl groups bonding to the polymer main chain are preferable.

The oxycarbonyl group as a substituent in the polyanion is preferably an alkyloxycarbonyl group or an aryloxycarbonyl group directly bonding to the polymer main chain, or an alkyloxycarbonyl group or an aryloxy carbonyl group bonding thereto via any other functional group.

The composition of the polymer chain of the polyanion is not specifically limited. Examples of the polymer chain include a polyalkylene, a polyimide, a polyamide, and a polyester. Among these, a polyalkylene is preferable in terms of easy synthesis and availability.

The polyalkylenes are polymers with a recurring unit of an ethylenically unsaturated monomer. The polyalkylenes may have a carbon-carbon double bond on the main chain. Examples of the polyalkylenes include polyethylene, polypropylene, polybutene, polypentene, polyhexene, polyvinyl alcohol, polyvinyl phenol, poly (3,3,3-trifluoropropylene), polyacrylonitrile, polyacrylate, polymethacrylate, polystyrene, polybutadiene, and polyisoprene.

Examples of the polyimides include those produced by polycondensing an acid anhydride such as pyromellitic dianhydride, biphenyltetracarboxylic dianhydride, benzophenonetetracarboxylic dianhydride, 2,2,3,3-tetra carboxydiphenyl ether dianhydride, or 2,2-[4,4'-di(dicarboxypheny-loxy)phenyl] propane dianhydride with a diamine such as oxydianiline, paraphenylenediamine, meta phenylenediamine, or benzophenonediamine.

Examples of the polyamides include polyamide 6, polyamide 6,6, and polyamide 6,10.

Examples of the polyesters include polyethylene terephthalate and polybutylene terephthalate.

Specific examples of the polymers with a sulfonate group, which are suitably used as the polyanion, include polyvinylsulfonate, polystyrenesulfonate, polyallylsulfonate, polyethyl acrylate sulfonic acid, polybutyl acrylate sulfonic acid, poly(2-acrylamide-2-methylprop anesulfonic acid), and polyisoprene sulfonic acid. These may be a homopolymer or a copolymer of two or more kinds of monomers. Among these, polystyrenesulfonate, polyisoprene sulfonic acid, polyethyl acrylate sulfonic acid, and polybutyl acrylate sulfonic acid are preferable, and polystyrenesulfonate (commonly known as PSS) is more preferable in terms of the addition of conductivity.

The polyanion, particularly the polymer with a sulfonate group, enhances the dispersibility of the monomer for obtaining a conjugated conductive polymer in a dispersion medium, and serves as a dopant for the conjugated conductive polymer.

The polyanion used in the present invention has a weight average molecular weight of preferably 1000 to 1000000, more preferably 5000 to 500000, further more preferably 50000 to 300000. The weight average molecular weight in this range enhances the solubility of the polyanion in a dispersion medium and successfully dopes the conjugated conductive polymer with the polyanion. The weight average molecular weight as referred to herein is measured as polystyrene-equivalent molecular weight by gel permeation chromatography.

The polyanion with the above-mentioned characteristics may be selected from commercially available ones or may be obtained by a well-known synthesis method. Examples of the synthesis method of the polyanion are described in JP 2005-76016 A (US Application Publication 2007/096066).

The amount of the polyanion to be used, that is, the total amount to be used of the polyanion calculated by combining the amount thereof for use for forming a protective colloid for seed particles and the charge-in amount thereof to be previously charged before the start of polymerization and the amount thereof to be added during the polymerization is preferably 0.25 to 30 mol, more preferably 0.8 to 25 mol, based on 1 mol of the monomer for producing the conjugated conductive polymer.

The amount to be used of the polyanion is preferably 10 to 30000 parts by mass, more preferably 50 to 25000 parts by mass, based on 100 parts by mass of the conjugated conductive polymer in this step.

When the amount of polyanion used is 10 parts by mass or more, the conductivity of the conductive polymer is suitable, and when the amount is 30000 parts by mass or less, the dispersibility of the conductive polymer in a dispersion medium is good.

[1-6. Seed Particles with Protective Colloid Formed of Polyanion]

The liquid dispersion composition for solid electrolytic capacitor production may optionally contain, as needed for greatly lowering the viscosity of the reaction liquid in polymerization to give a conjugated conductive polymer, seed particles with protective colloid formed of a polyanion. The seed particles with protective colloid formed of a polyanion may be produced by forming a protective colloid with a polyanion of seed particles in a dispersion medium.

The seed particles for use in the present invention are polymer particles to form a protective colloid with a polyanion in a dispersion medium. Preferred examples of the seed particles include those of a polymer that contains one or more kinds of ethylenically unsaturated monomers as a structural unit. The polymer may be one kind alone or may be a mixture of two or more kinds of polymers, and may be crystalline or amorphous. The crystalline polymer preferably has a crystallinity of 50% or less.

The ethylenically unsaturated monomer may be any one having one or more polymerizable ethylenic carbon-carbon double bonds. Examples of the ethylenically unsaturated monomer include (meth)acrylic esters with a linear, a branched, or a cyclic alkyl chain; an aromatic vinyl compound such as styrene and α-methylstyrene; heterocyclic vinyl compounds such as vinylpyrrolidone; dialkylaminoalkyl (meth)acrylates; 2 ethylhexyl (meth)acrylate; vinyl esters such as vinyl acetate, and vinyl alkanoate; monoolefins such as ethylene, propylene, butylene, and isobutylene; conjugated diolefins such as butadiene, isoprene, and chloroprene; α,β-unsaturated mono- or di-carboxylic acids such as acrylic acid, methacrylic acid, crotonic acid, itaconic acid, maleic acid, and fumaric acid; vinyl cyanide compounds such as acrylonitrile; and carbonyl group-containing vinyl compounds such as acrolein and diacetone acrylamide. These ethylenically unsaturated monomers may be used one kind alone or in combination with two or more kinds.

The ethylenically unsaturated monomer may contain a crosslinkable monomer, and the monomers together may be crosslinked, or the monomer may be crosslinked with an ethylenically unsaturated compound having an active hydrogen group as combined therewith. The crosslinked copolymer can improve the water resistance, moisture resistance and heat resistance of a conductive film. The crosslinkable monomer means a compound having 2 or more ethylenic carbon-carbon double bonds, or a compound having one or more ethylenic carbon-carbon double bond and having one or more other reactive groups.

Examples of the crosslinkable monomer include an epoxy group-containing α,β-ethylenically unsaturated compound such as glycidyl (meth) acrylate; a hydrolyzable alkoxysilyl group-containing α,β-ethylenically unsaturated compound such as vinyltriethoxysilane and γ-methacryloxypropyltrimethoxysilane; and a polyfunctional vinyl compound such as ethylene glycol di(meth)acrylate, trimethylolpropane tri(meth)acrylate, allyl (meth)acrylate, divinylbenzene, and diallyl phthalate.

Combined with a polyhydrazine compound (in particular, a compound with two or more hydrazide groups, such as oxalic acid dihydrazide, succinic acid dihydrazide, adipic acid dihydrazide, or polyacrylic acid hydrazide), a cross-linkable monomer such as a carbonyl group-containing α,β-ethylenically unsaturated compound (containing a ketone group) may be crosslinked.

The content of the crosslinkable monomer in the ethylenically unsaturated monomer is preferably 50.0% by mass or less, more preferably 35.0% by mass or less, even more preferably 25.0% by mass or less.

[1-7. Other Additives]

As needed, a morpholine compound represented by the following general formula (7) may be added to the liquid dispersion composition for solid electrolytic capacitor production.

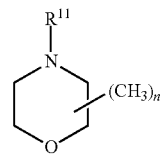

(7)

By adding the morpholine compound, a solid electrolytic capacitor having a high capacitance incidence ratio (electrostatic capacitance), excellent in heat resistance and having a high reliability under high-temperature conditions can be produced. In addition, the resultant solid electrolytic capacitor can be given corrosion resistance, and the pH of the liquid dispersion containing a conjugated conductive polymer can be controlled.

In the general formula (7), $R^{11}$ represents (1) a hydrogen atom, (2) an alkyl group with 1 to 8 carbon atoms optionally substituted with a hydroxy group, a cyano group or an amino group, (3) a cycloalkenyl group with 5 to 6 carbon atoms, (4) a phenyl group optionally substituted with an amino group, a cyano group or a formyl group, (5) an acetyl group, (6) an acetoacetyl group, (7) an allyl group, (8) an acryloyl group, (9) a pyridyl group, (10) an alkylsulfonyl group optionally substituted with a hydroxy group, or (11) a formyl group, and n represents 0, 1 or 2.

Specific examples of the compound represented by the general formula (7) include morpholine, 4-methylmorphline, 4-ethylmorphline, 4-n-propylmorpholine, 4-isopropylmorpholine, 4-n-butylmorpholine, 4-isobutylmorpholine, 4-pentylmorpholine, 4-hexylmorpholine, (H)-3-methylmorpholine, (S)-3-methylmorpholine, cis-2,6-dimethylmorpholine, 4-(1-cyclohexenyl)morpholine, 1-morpholino-1-cyclopentene, 4-phenylmorpholine, 4-(p-tolyl)morpholine, 4-(2-aminoethyl)morpholine, 4-(3-aminopropyl)morpholine, 2-morpholinoaniline, 4-morpholinoaniline, 4-(2-morpholinoethoxy) aniline, 4-(4-pyridyl)morpholine, 4-aminomorpholine, 4-(2-hydroxypropyl)morpholine, 4-(2-hydroxyethyl)morpholine 4-(3-hydroxypropyl)morpholine, 2-hydroxy-3-morpholinopropanesulfonic acid, 2-morpholinoethanesulfonic acid, 3-morpholinopropanesulfonic acid, 4-acetylmorpholine, 4-acetoacetylmorpholine, 4-acryloylmorpholine, 4-allylmorpholine, phenylmorpholine, ethyl 3-(morpholino)propionate, 4-formylmorpholine, 4-(4-formylphenyl)morpholine, and salts of these compounds.

Among these, morpholine, 4-ethylmorpholine, 4-n-butylmorpholine, 4-isobutylmorpholine, 4-phenylmorpholine, 4-(2-hydroxypropyl)morpholine, 4-(2-hydroxyethyl) morpholine, and 4-(3-hydroxypropyl)morpholine are preferred from the viewpoint of productivity.

The amount of the morpholine compound to be added to the liquid dispersion composition for solid electrolytic capacitor production is preferably 0.1 to 4 equivalents based on the neutralization equivalent of the liquid dispersion composition for solid electrolytic capacitor production, more preferably 0.4 to 2 equivalents. When the amount is 0.1 equivalents or more, the addition effect is noticeable. When the amount is 4 equivalents or less, the polyanion that dopes the conjugated conductive polymer hardly dedopes.

The amount of the morpholine compound to be added to the liquid dispersion composition for solid electrolytic capacitor production is preferably so controlled that the pH of the resultant composition could fall within a range of 3 to 13, more preferably 4 to 7. When the pH is 3 or more, corrosion with a valve metal such as aluminum hardly proceeds. When the pH is 13 or less, the polyanion that dopes the conjugated conductive polymer hardly dedopes.

Further as needed, any other additive than the morpholine compound represented by the general formula (7) may be added to the liquid dispersion composition for solid electrolytic capacitor production. The other additives are not specifically limited as long as miscible with the conjugated conductive polymer, the seed particles with protective colloid formed of a polyanion, the polyanion and the compound (a).

Examples of such additives include a water-soluble polymer compound, a water-dispersible compound, an alkaline compound, a surfactant, a defoaming agent, a coupling agent, an antioxidant, and a conductivity enhancer. One alone or two or more kinds of such additives may be used either singly or as combined.

The water-soluble polymer compound is a water-soluble polymer with a cationic group and a nonionic group on the main chain or the side chains. Specific examples of the water-soluble polymer compound include polyoxyalkylenes, water-soluble polyurethanes, water-soluble polyesters, water-soluble polyamides, water-soluble polyimides, water-soluble polyacryls, water-soluble polyacrylamides, polyvinyl alcohols, and polyacrylic acids. Among these, polyoxyalkylenes are desirable.

Specific examples of the polyoxyalkylenes include diethylene glycol, triethylene glycol, oligopolyethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, ethylene glycol diglycidyl ether, polyethylene glycol diglycidyl ether, glycidyl ether, polyethylene glycol glycidyl ether, polyethylene oxide, triethylene glycol dimethyl ether, tetraethylene glycol dimethyl ether, diethylene glycol dimethyl ether, diethylene glycol diethyl ether diethylene glycol dibutyl ether, dipropylene glycol, tripropylene glycol, polypropylene glycol, polypropylene dioxide, polyoxyethylene alkyl ether, polyoxyethylene glycerin fatty acid ester, and polyoxyethylene fatty acid amide.

The water-dispersible compound is formed by substituting a part of a low hydrophilic compound with a high hydrophilic functional group or by adsorbing a compound with a high hydrophilic functional group on a low hydrophilic compound (e.g. emulsion). The water-dispersible compound is dispersed without being precipitated in water. The specific examples of the water-dispersible compound include polyester, polyurethane, acrylic resin, silicone resin, and the emulsion thereof. The examples also include a block copolymer and a graft copolymer of an acrylic resin and any other copolymer such as polyester or polyurethane.

The water-soluble polymer compound and the water-dispersible compound can be used one kind alone or in combination with two or more kinds. Adding the water-soluble polymer compound and the water-dispersible compound can adjust the viscosity of the liquid dispersion containing the conductive polymer and improves the application properties.

The amount of the water-soluble polymer compound and the water-dispersible compound to be added is preferably 1 to 4000 parts by mass, more preferably 50 to 2000 parts by mass, based on 100 parts by mass of the total amount of the conjugated conductive polymer and the seed particles with protective colloid formed of a polyanion. When the amount of the water-soluble polymer compound and the water-dispersible compound falls within a range of 1 to 4000 parts by mass, suitable conductivity can be expressed to make the resultant solid electrolytic capacitor have a good equivalent series resistance (ESR).

In addition to the morpholine compound, an alkaline compound may be added to the liquid dispersion composition for solid electrolytic capacitor production. This addition of an alkaline compound can provide corrosion resistance to articles to which the liquid dispersion is applied and adjust the pH of the conjugated conductive polymer-containing liquid dispersion.

As the alkaline compound, well-known inorganic alkaline compounds and organic alkaline compounds except morpholine compounds can be used. Examples of the inorganic alkaline compounds include ammonia, sodium hydroxide, potassium hydroxide, and calcium hydroxide. Examples of the organic alkaline compounds include aromatic amines, aliphatic amines, and alkaline metal alkoxides.

Among the aromatic amines, nitrogen-containing heteroaryl cyclic compounds are preferable. The nitrogen-containing heteroaryl cyclic compounds are a nitrogen-containing hetero cyclic compound with aromaticity. In the aromatic amines, the nitrogen atom contained in the heterocycle has conjugate relationship with other atoms.

Examples of the nitrogen-containing heteroaryl cyclic compounds include pyridines, imidazoles, pyrimidines, pyrazines, and triazines. Among these, pyridines, imidazoles, and pyrimidines are preferable from the viewpoint of solvent solubility.

Examples of the aliphatic amines include ethylamine, n-octylamine, diethylamine, diisobutylamine, methylethylamine, trimethylamine, triethylamine, allylamine, 2-ethylaminoethanol, 2,2'-iminodiethanol, and N-ethylethylenediamine.

Examples of the alkaline metal alkoxides include sodium alkoxides such as sodium methoxide and sodium ethoxide; potassium alkoxide; and calcium alkoxides.

Examples of the surfactants include anionic surfactants such as carboxylic acid salts, sulfonic acid salts, sulfate salts, and phosphate salts; cationic surfactants such as amine salts and quaternary ammonium salts; amphoteric surfactants such as carboxybetaine, aminocarboxylic acid salts, and imidazoliumbetaine; and nonionic surfactants such as polyoxyethylene alkyl ether, polyoxyethylene glycerin fatty acid ester, ethylene glycol fatty acid ester, and polyoxyethylene fatty acid amide.

Examples of the antifoams include silicone resin and polydimethylsiloxane.

Examples of the antioxidants include phenolic antioxidants, amine antioxidants, phosphorus antioxidants, sulfur antioxidants, saccharides, and vitamins.

The electric conductivity improvers are not limited in particular as long as increasing the electric conductivity of the liquid dispersion containing the conductive polymer. Examples of the electric conductivity improvers include compounds containing an ether bond, such as tetrahydrofuran; compounds containing a lactone group, such as γ-butyrolactone and γ-valerolactone; amides and compounds containing a lactam group, such as caprolactam, N-methylcaprolactam, N,N-dimethylacetamide, N-methylacetamide, N,N-dimethylformamide, N-methylformamide, N-methylformanilide, N-methylpyrrolidone, N-octylpyrrolidone, and pyrrolidone; sulphone compounds and sulphoxide compounds, such as tetramethylene sulfone and dimethyl sulfoxide; saccharides such as sucrose, glucose, fructose, and lactose and derivative thereof sugar alcohols such as sorbitol and mannitol; imides such as succinimide and maleimide; furan derivatives such as 2-furancarboxylic acid and 3-furancarboxylic acid; and dialcohols and polyalcohols such as ethylene glycol, propylene glycol, glycerin, diethylene glycol, and triethylene glycol. Among these, tetrahydrofuran, N-methylformamide, N-methylpyrrolidone, ethylene glycol, propylene glycol, glycerin, dimethyl sulfoxide, and sorbitol are preferable, and ethylene glycol, propylene glycol, diethylene glycol, triethylene glycol and glycerin are particularly more preferable, from the viewpoint of improving the electric conductivity. The electric conductivity improvers can be used one kind alone or in combination with two or more kinds.

<Second Aspect of Invention: Method for Producing Solid Electrolytic Capacitor>

Hereinafter the first embodiment of the production method for a solid electrolytic capacitor is described.

[2-1. Step C1: Step of Adhering a Liquid Dispersion Composition for Solid Electrolytic Capacitor Production to a Porous Anode Body]

A production method for a solid electrolytic capacitor of the second aspect of the present invention includes a step (step C1) of adhering the liquid dispersion composition for solid electrolytic capacitor production of the first aspect of the invention, to a porous anode body made of a valve metal having a dielectric coating film on the surface thereof.

The solid electrolytic capacitor to be produced according to the production method of the present invention can have, for example, a porous electrode produced by sintering a valve action metal powder having a high surface area, or an electrode of a porous film produced by etching a valve metal foil.

Examples of the valve metal include aluminum (Al), beryllium (Be), bismuth (Bi), magnesium (Mg), germanium (Ge), hafnium (Hf), niobium (Nb), antimony (Sb), silicon (Si), tin (Sn), tantalum (Ta), titanium (Ti), vanadium (V), tungsten (W), and zirconium (Zr); and alloys and compounds of at least one of these metals and other elements. Particularly, electrode materials made of a valve metal such as Al, Nb or Ta are preferable.

For example, the porous electrode made of a valve metal has a dielectric oxide film formed on the surface through anodic oxidation to be a porous anode body.

For example, the porous electrode is anodically oxidized by applying voltage in phosphoric acid solution to form a dielectric oxide film. The size of the formation voltage can be determined by the thickness of the dielectric oxide film and the withstand voltage of the capacitor. The preferable formation voltage is 1 to 800 V more preferably 1 to 300 V.

Then, the liquid dispersion composition for solid electrolytic capacitor production of the first aspect of the invention is adhered to the porous anode body. Regarding the adhering method, any known method of coating, spraying or immersion is employable. Particularly, immersion is preferable because the liquid dispersion composition for solid electrolytic capacitor production can be adhered to and can permeate the porous anode body uniformly. For penetration into the details of the porous anode body, the composition may be applied to the body under reduced pressure.

The immersion time is typically approximately 10 seconds to 5 minutes. The temperature of the liquid dispersion composition for solid electrolytic capacitor production depends on the kind of the dispersion medium but is typically approximately 10 to 35° C.

[2-2. Step D1: Step of Forming Solid Electrolyte Layer]

The production method for a solid electrolytic capacitor of the second aspect of the invention includes a step (step D1) of removing the dispersion medium from the liquid dispersion composition for solid electrolytic capacitor production of the first aspect of the invention that has adhered to the porous anode body in the previous step (C1) thereby to form a solid electrolyte layer. Removal of the dispersion medium in this step (D1) does not mean removal of all the dispersion medium, but in this step, a part of the dispersion medium may remain within a range not having any negative influence on solid electrolytic capacitor production.

For dispersion medium removal, heat treatment is preferred from the viewpoint of efficiency. The heating condition can be determined in consideration of the boiling point and the volatility of the dispersion medium. Preferably, the heating is carried out within a temperature range not causing degradation of the conductive polymer by oxygen, for example, at 50 to 300° C., preferably 100 to 200° C. The heat treatment time is preferably 5 seconds to a few hours. For the heat treatment, for example, a hot plate, an oven, and a hot air dryer can be used. The heat treatment can be conducted under atmospheric pressure or accelerated under reduced pressure.

In the present invention, the step (C1) of adhering the liquid dispersion and the step (D1) of forming the solid electrolyte layer each may be carried out once or may be repeated twice or more, depending on the type of the electrode body. Whenever the liquid dispersion has been adhered, the heat treatment may be conducted to remove a part or all of the dispersion medium. Alternatively, the liquid dispersion may be continuously adhered several times, and then the dispersion medium may be removed at the end. The dispersion medium contained in the adhered liquid dispersion may be partially or fully removed, and then the porous anode body may be impregnated with any electrolyte solution.

<Third Aspect of Invention: Production Method for Solid Electrolytic Capacitor>

Hereinafter the second embodiment of the production method for a solid electrolytic capacitor is described.

A production method for a solid electrolytic capacitor of the third aspect of the present invention includes a step (step A) of preparing a conjugated conductive polymer-containing liquid dispersion (i) by polymerizing a monomer compound in a dispersion medium containing seed particles with protective colloid formed of a polyanion or in a dispersion medium containing a polyanion, a step (step B) of adding the above-mentioned compound (a) to the conjugated conductive polymer-containing liquid dispersion (i) to prepare a dispersion (ii) containing the compound (a) and the conjugated conductive polymer, a step (step C2) of adhering the dispersion (ii) to a porous anode body formed of a valve metal having a dielectric coating film on the surface thereof, and a step (step D2) of removing the dispersion medium from the liquid dispersion (ii) having adhered to the porous anode body to form a solid electrolyte layer.

[3-1. Step (A): Preparation of Conjugated Conductive Polymer-Containing Liquid Dispersion]

First, in a dispersion medium containing seed particles with protective colloid formed of a polyanion or in a dispersion medium containing a polyanion, a monomer compound is polymerized to give a conjugated conductive polymer-containing liquid dispersion (hereinafter this may be abbreviated as "dispersion (i)") (step A).

In this step (A), it is considered that a conjugated conductive polymer is doped with a polyanion to form a complex, and the conjugated conductive polymer produced through polymerization is formed as a complex of the conjugated conductive polymer and seed particles with protective colloid formed of a polyanion, or as a liquid dispersion of a complex of the conjugated conductive polymer and a polyanion dispersed in a dispersion medium. The details of the polyanion and the seed particles with protective colloid formed of a polyanion are as described above.

(3-1-2. Production of Seed Particles with Protective Colloid Formed of Polyanion)

The seed particles are formed as a protective colloid with a polyanion in a dispersion medium. The liquid dispersion of the seed particles with protective colloid can be produced as a resin emulsion.

The resin emulsion production is radical polymerization, which is conducted with a normal pressure reactor or a pressure-tight reactor by a batch, a semicontinuous, or a continuous method. Preferably, the ethylenically unsaturated monomer and the polyanion are dissolved, emulsified, or dispersed in the respective dispersion media, and then the ethylenically unsaturated monomer solution is continuously or intermittently added and polymerized in the polyanion-containing solution, in terms of polymerization stability and polymer homogeneity.

The reaction temperature is typically 10 to 100° C., and preferably 30 to 90° C. The reaction time is not limited in particular and may be appropriately adjusted according to the amount used of each component, the kind of polymerization initiator, the reaction temperature, etc.

In the radical polymerization, the protective colloidal polyanion contributes to the stability of the emulsion particles, but an emulsifier such as an anionic emulsifier, a nonionic emulsifier, or a reactive emulsifier, or an aliphatic amine may be optionally added in the polymerization system. The kind and the amount used of the emulsifier or the aliphatic amine may be appropriately adjusted according to various conditions including the amount used of the polyanion and the composition of the ethylenically unsaturated monomer.

Examples of the emulsifier used for the radical polymerization include anionic emulsifiers such as alkyl sulfonic acid salts, alkylbenzene sulfonic acid salts, alkyl sulfosuccinate salts, alkyl diphenyletherdisulfonic acid salts, polyoxyalkylene alkyl sulfuric acid salts, and polyoxyalkylene alkyl phosphates; and nonionic surfactants such as polyoxyalkylene alkyl ethers, polyoxyalkylene alkylphenol ethers, polyoxyalkylene fatty acid esters, and polyoxyalkylene sorbitan fatty acid esters.

Examples of the aliphatic amine include primary amines such as octylamine, laurylamine, myristylamine, stearylamine, and oleylamine; secondary amines such as dioctylamine, dilaurylamine, distearylamine, and dioleoylamine; and tertiary amines such as N,N-dimethyllaurylamine, N,N-dimethylmyristylamine, N,N-dimethylpalmitylamine, N,N-dimethylstearylamine, N,N-dimethylbehenylamine, N,N-dimethyloleylamine, N-methyldidecylamine, and N-methyldioleylamine.

The emulsifier and the aliphatic amine may be used one kind alone or in combination with two or more kinds.

Water-soluble polymers such as polyvinyl alcohol, methylcellulose, carboxymethylcellulose, hydroxyethylcellulose, hydroxypropylcellulose, and polyvinylpyrrolidone may be used unless losing the characteristics of the obtained conjugated conductive polymer.

As the dispersion medium in production of seed particles, water or a water-based solvent of a mixed solvent of water and a water-soluble solvent is used. The content of the water-soluble solvent in the mixed solvent is preferably 0.0 to 30.0 mass %. When the content of the water soluble solvent is 30.0 mass % or less, the polymerization stability of the resin emulsion is likely to be improved. Examples of the water-soluble solvent include alcohols such as methanol, ethanol, and isopropyl alcohol; ketone such as acetone; glycols such as ethylene glycol and propylene glycol; and ethers such as ethylene glycol monomethyl ether and ethylene glycol monobutyl ether.

In the radical polymerization, a well-known common polymerization initiator can be used. Examples of the polymerization initiator include inorganic peroxides such as hydrogen peroxide, persulfate, ammonium persulfate, potassium persulfate, and sodium persulfate; organic peroxides such as benzoyl peroxide and t-butyl hydroperoxide; and azo compounds such as 2,2'-azobisisobutyronitrile and 4,4'-azobis (4-cyano valeric acid). The polymerization initiator may be optionally combined with sodium sulfoxylate formaldehyde, ascorbic acids, sulfites, tartaric acid or a salt thereof, or iron (II) sulfate for redox polymerization. Furthermore, a chain transfer agent such as an alcohol or a mercaptan may be optionally used.

Regarding the amount of the polyanion and the ethylenically unsaturated monomer to be used in production of seed particles with protective colloid, the amount of the ethylenically unsaturated monomer is preferably 10 to 100 parts by mass based on 100 parts by mass of the polyanion, more preferably 20 to 90 parts by mass. When the amount of the ethylenically unsaturated monomer is 10 parts by mass or more, the proportion of the conductive polymer that contains seed particles with protective colloid formed of a polyanion relative to the conjugated conductive polymer is suitable, and therefore viscosity increase in polymerization can be suppressed. When the amount is 100 parts by mass or less, the stability of the seed particles with protective colloid is good.

The particle size d50 (median size at 50% on volumetric basis) of the seed particle with protective colloid dispersed in the dispersion medium is preferably 0.01 to 10 µm, more preferably 0.05 to 1 µm, further more preferably 0.1 to 0.8 µm. The particle size distribution of the seed particles can be measured with a particle size distribution measurement device "Microtrac UPI" available from NIKKISO Co., Ltd. When the particle size d50 of the seed particles dispersed in the dispersion medium is 0.01 µm or more, the dispersibility of the seed particles is improved. When the particle size d50 is 10 µm or less, the particle settling is suppressed.

[3-1-3. Polymerization of Monomer Compound]

The monomer compound for producing a conjugated conductive polymer is polymerized (1) in a dispersion medium containing the monomer compound and seed particles with protective colloid formed of a polyanion, or (2) in a dispersion medium containing the monomer compound and a polyanion.

(3-1-3-1. Liquid Dispersion of Monomer Compound)

To polymerize the monomer compound for producing a conjugated conductive polymer in a dispersion medium, a liquid dispersion containing the monomer compound and seed particles with protective colloid formed of a polyanion, or a liquid dispersion containing the monomer compound and a polyanion (hereinafter these may be together abbreviated as "monomer liquid") is prepared.

The monomer liquid may be any one in which the monomer compound for producing a conjugated conductive polymer is dissolved, emulsified or dispersed, and for this, in general, a powerful stirring device such as a homogenizer or an ultrasonic radiator is used. The ultrasonic irradiation energy is not specifically limited so far as producing a uniform monomer liquid. The ultrasonic irradiation is preferably conducted at a power consumption of 5 to 500 W/L (liter) for an irradiation time of 0.1 to 2 hr/L (liter).

In the case where a liquid dispersion containing the monomer compound for producing the conjugated conductive polymer, and seed particles with protective colloid formed of a polyanion is used as a monomer liquid, preferably, the polyanion in the monomer liquid is the same polyanion as that used in forming protective colloid of seed particles, from the viewpoint of preventing the conjugated conductive polymer produced through polymerization from aggregating. The polyanion can be added to and dissolved, emulsified or dispersed in the monomer liquid. In the case where the monomer liquid contains any additional polyanion than that contained in the dispersion liquid of the seed particles with protective colloid, the amount of the polyanion is preferably 5.0 to 99.0% by mass based on the total amount of the polyanion used, more preferably 10.0 to 90.0% by mass, even more preferably 20.0 to 80.0% by mass.

(3-1-3-2. Dispersion Medium)

The dispersion medium for use in polymerizing the monomer compound to produce the conjugated conductive polymer is not specifically limited as long as the dispersion medium can disperse a composite of the conjugated conductive polymer and the seed particles with protective colloid formed of a polyanion, or a composite of the conjugated conductive polymer and a polyanion, and can dissolve or disperse the compound (a), but is preferably the same one as that used in the liquid dispersion of the seed particles with protective colloid formed of a polyanion.

Regarding specific and preferred examples of the dispersion medium, reference may be made to those of the dispersion medium in the first aspect of the invention described hereinabove.

The amount to be used of the dispersion medium is preferably 1 to 50000 parts by mass, more preferably 50 to 10000 parts by mass, based on 100 parts by mass of the total amount of the monomer compound for producing the conjugated conductive polymer, the seed particles with protective anion formed of a polyanion, and the polyanion. When the amount of the dispersion medium is 1 part by mass or more, the viscosity during polymerization is suitable, and when the amount is 50000 parts by mass or less, the performance of the resultant solid electrolytic capacitor can be good.

(3-1-3-3. Oxidizing Agent)

When the monomer compound is polymerized, for example, when the dispersion liquid containing polypyrroles and polythiophenes as the conjugated conductive polymer is prepared, the polymerization starts with a predetermined temperature in the presence of an oxidizing agent.

Examples of the oxidizing agent include peroxodisulfuric acid; peroxodisulfuric acid salts such as ammonium peroxodisulfate, sodium peroxodisulfate, and potassium peroxodisulfate; a metal halogenated compound such as boron trifluoride; transition metal compounds such as iron (III) chloride, iron (III) sulfate, and cupric chloride; metal oxides such as silver oxide and cesium oxide; peroxides such as hydrogen peroxide and ozone; an organic peroxide such as benzoyl peroxide; and oxygen. Among these, peroxodisulfuric acid and peroxodisulfuric acid salts are preferable, and peroxodisulfuric acid salts are more preferable.

The oxidizing agent can be used one kind alone or in combination with two or more kinds.

(3-1-3-4. Polymerization Temperature)

The polymerization temperature in the polymerization of the monomer is typically 5 to 80° C., preferably 10 to 60° C., more preferably 15 to 40° C. The temperature within this range can polymerize the monomer at a moderate reaction rate, suppress the increase in the viscosity, prepare the dispersion liquid containing the conductive polymer within an economical and stable time, and be likely to increase the conductivity of the resultant conductive polymer. The polymerization temperature can be controlled with a well-known heater and an air conditioner. The monomer may be polymerized while the polymerization temperature is changed within the above-mentioned range as needed.

(3-1-3-5. Dispersion Treatment)

In the step (A) to prepare a conjugated conductive polymer-containing liquid dispersion, preferably, the conjugated conductive polymer produced in polymerization of the monomer compound is dispersed. This dispersion treatment is preferably carried out with a high-powered mixer such as a homogenizer, or through ultrasonic irradiation. This dispersion treatment can suppress the agglomeration of the conjugated conductive polymer with a long main chain. For example, preferably, the dispersion treatment is carried out according to the method described in JP 2007-332183 A) (U.S. Pat. No. 7,960,499) where the polymerization is carried out with stirring at a shear rate of 5000 $s^{-1}$ or more, or in the case of ultrasonic irradiation, the dispersion treatment is carried out at a consumption power of preferably 5 to 500 W/L until the reaction ends.

(3-1-3-6. Addition of Liquid Dispersion of Seed Particles with Protective Colloid)

Also preferably, a dispersion of seed particles with protective colloid formed of a polyanion is further added during polymerization using a liquid dispersion containing the above-mentioned monomer compound and seed particles with protective colloid. By adding a predetermined amount of a liquid dispersion of seed particles with protective colloid during polymerization, viscosity increase of the reaction liquid during polymerization can be suppressed, stirring and mixing efficiency can be improved 90%, and load to the production apparatus can be reduced. The amount of the liquid dispersion of seed particles with protective colloid to be added during polymerization is preferably 10 to 90% by mass of the total amount of the liquid dispersion of seed particles with protective colloid to be used, more preferably 20 to 70% by mass.

(3-1-3-7. Addition of polyanion)

A polyanion may be further added during polymerization of the monomer compound. By further adding a part of a predetermined amount of a polyanion during polymerization, viscosity increase of the reaction liquid during polymerization can be suppressed, stirring and mixing efficiency can be improved, and load to the production apparatus can be reduced. The amount of the polyanion to be added during polymerization is preferably 0 to 90% by mass of the total amount of the polyanion to be used, more preferably 20 to 70% by mass.

[3-2. Step (B): Preparation of Liquid Dispersion Containing Conjugated Conductive Polymer and Compound (a)]

The production method for a solid electrolytic capacitor of the third aspect of the present invention includes a step (step B) of adding the above-mentioned compound (a) to the conjugated conductive polymer-containing liquid dispersion (i) prepared in the step (A), thereby preparing the liquid dispersion composition for solid electrolytic capacitor product, as a dispersion (ii) containing the compound (a) and the conjugated conductive polymer. As needed, other additives mentioned above may be added to the dispersion (ii).

[3-3. Step (C2): Step of Adhering the Dispersion (ii) to Porous Anode Body Formed]

The production method for a solid electrolytic capacitor of the third aspect of the present invention includes a step (step C2) of adhering the dispersion (ii) to a porous anode body formed of a valve metal having a dielectric coating film on the surface thereof.

The step (C2) can be carried out in the same manner as that for the above-mentioned step (C1) except that the liquid dispersion composition for solid electrolytic capacitor production of the first aspect of the present invention is changed to the dispersion (ii).

[3-4. Step (D2): Step of Forming Solid Electrolyte Layer]

The production method for a solid electrolytic capacitor of the third aspect of the present invention includes a step (step D2) of removing the dispersion medium from the liquid dispersion (ii) having adhered to the porous anode body prepared in the previous step (C2) thereby to form a solid electrolyte layer.

The step (D2) can be carried out in the same manner as that for the above-mentioned step (D1) except that the liquid dispersion composition for solid electrolytic capacitor production of the first aspect of the present invention is changed to the dispersion (ii).

EXAMPLES

The present invention is more specifically explained below with reference to the following Examples and Comparative Examples but not limited thereto. Methods for measurement of physical properties of the dispersion liquids in Examples and Comparative Examples are mentioned below.

(1) Solid Content Concentration

About 10 g of a sample prepared in each example was analyzed, using an IR moisture meter (model: FD-720 available from Kett Electric Laboratory, heating condition 110° C./30 min), and the evaporation residue was calculated as a solid content.

(2) pH

The pH of the dispersion liquid produced in each example was measured at 25° C. with a pH meter (model: HM-30G, available from DKK-TOA CORPORATION).

(3) Particle Size of Seed Particles

The particle size of the seed particles was measured with a particle size distribution measurement device "Microtrac UPA" available from NIKKISO Co., Ltd.

(4) Weight-Average Molecular Weight of Sodium Polystyrenesulfonate

The weight-average molecular weight was measured by gel permeation chromatography. For the measurement, "Shodex (registered trademark) GPC 101" (Column OHPak SB-806M HQ) available from SHOWA DENKO K.K. was used. As the measurement conditions, the column temperature was 40° C., the eluent was water, and the elution rate was 1 ml/min. The weight-average molecular weight (Mw) is based on standard polystyrene.

[Production of Liquid Dispersion of Seed Particles with Protective Colloid Formed of Polyanion]

86 g of styrene, 49 g of 2-ethylhexyl acrylate, 15 g of divinylbenzene and 500 g of a 22-mass % aqueous solution of sodium polystyrenesulfonate (Poly-NaSS PS-5 available from TOSOH ORGANIC CHEMICAL CO., Ltd., weight-average molecular weight: 120,000) were mixed with stirring to prepare a monomer mixture. On the other hand, 1000 g of a 22-mass % aqueous solution of sodium polystyrenesulfonate (same as above) was heated up to 80° C. with stirring, and 2 g of potassium persulfate was added thereto. The above-mentioned monomer mixture and 40 g of a 2.5-mass % aqueous solution of potassium persulfate were dropwise added to the solution, each taking 2 hours and 2.5 hours. After the dropwise addition, this was kept at 80° C. for 2 hours, and then cooled to room temperature (25° C.). 1500 ml of a cation exchange resin (IR120B-H, available from ORGANO CORPORATION) and 1500 ml of an anion exchange resin (IRA410-OH, available from ORGANO CORPORATION) were added to the resultant reaction liquid, and after stirring for 12 hours, the ion exchange resins were separated through filtration. Ion-exchanged water (hereinafter simply referred to as water) was added so as to make the solid concentration 15.0% by mass, thereby preparing a liquid dispersion of seed particles with protective colloid formed of a polyanion (Tg: 30° C., particle size d50: 0.46 μm).

Production Example 1; Conjugated Conductive Polymer-Containing Liquid Dispersion Containing Seed Particles with Protective Colloid Formed of Polyanion (i-1)

In a one-liter polyethylene container, 223.2 g of water, 31.5 g of a 12-mass % aqueous solution of sodium polystyrenesulfonate, and 34.0 g of the liquid dispersion of seed particles with protective colloid formed of a polyanion prepared in the above were mixed with stirring at 32° C. To the mixture, 2.80 g of 3,4-ethylenedioxythiophene was added at 32° C., and emulsified and mixed for 30 minutes with a homomixer (Robomix, available from PRIMIX Corporation, 4000 rpm) to prepare a monomer dispersion (sulfo group content based on 1 mol of 3,4-ethylenedioxythiophene: 1.9 mol). The sulfo group is derived from the 12-mass % aqueous solution of sodium polystyrenesulfonate and from sodium polystyrene sulfonate in the liquid dispersion.

The monomer dispersion was put into a 1-liter stainless container connected with a high-shear mixer (Milder (registered trademark) 303V, available from Pacific Machinery & Engineering Co., Ltd.; 5000 rpm) and a circulating pump, and stirred while circulated at 32° C. with a stirring blade and the high-shear mixer, and 5.89 g of sodium peroxodisulfate as an oxidizing agent and 6.88 g of a 1-mass % aqueous solution of iron(III) sulfate hexahydrate were added thereto to carry out polymerization for 24 hours. 221 g of the resultant reaction liquid and 79 g of water were put into a one-liter stainless container connected with a high-shear mixer (MagicLab, available from IKA Corporation, 1800 rpm) and a circulating pump, and processed for dispersion with circulating and stirring for 12 hours. To 300 g of the resultant liquid dispersion, 300 ml of a cation exchange resin (same as above) and 300 mL of an anion exchange resin (same as above) were added and stirred for 6 hours, and the ion exchange resins were removed through filtration. According to this operation, the unreacted monomer and the oxidizing agent were removed to give a liquid dispersion containing seed particles with protective colloid formed of a polyanion and a conjugated conductive polymer (solid concentration 2.7% by mass, pH 1.9).

Production Example 2: Conjugated Conductive Polymer-Containing Liquid Dispersion Containing Polyanion but not Containing Seed Particles (i-2)

In a one-liter polyethylene container, 231.0 g of water and 60.0 g of a 12-mass % aqueous solution of sodium polystyrenesulfonate were mixed with stirring at 32° C. To the mixture, 2.80 g of 3,4-ethylenedioxythiophene was added at 32° C., and emulsified and mixed for 30 minutes with a homomixer (Robomix, available from PRIMIX Corporation, 4000 rpm) to prepare a monomer dispersion.

The monomer dispersion was put into a 1-liter stainless container connected with a high-shear mixer (Milder (registered trademark) 303V, available from Pacific Machinery & Engineering Co., Ltd.; 5000 rpm) and a circulating pump, and stirred while circulated at 32° C. with a stirring blade and the high-shear mixer, and 5.89 g of sodium peroxodisulfate as an oxidizing agent and 6.88 g of a 1-mass % aqueous solution of iron(III) sulfate hexahydrate were added thereto to carry out polymerization for 24 hours. 221 g of the resultant reaction liquid and 79 g of water were put into a one-liter stainless container connected with a high-shear mixer (MagicLab, available from IKA Corporation, 1800 rpm) and a circulating pump, and processed for dispersion with circulating and stirring for 12 hours. To 300 g of the resultant liquid dispersion, 300 ml of a cation exchange resin (same as above) and 300 mL of an anion exchange resin (same as above) were added and stirred for 6 hours, and the ion exchange resins were removed through filtration. According to this operation, the unreacted monomer and the oxidizing agent were removed to give a liquid dispersion containing a complex of a polyanion and a conjugated conductive polymer (solid concentration 2.6% by mass, pH 1.8).

Production Example 3: Preparation of Porous Anode Body Having Dielectric Oxide Coating Film on the Surface Thereof According to the method described in JP 2011-77257 A, a porous anode body having a dielectric oxide coating film on the surface thereof for use for solid electrolytic capacitors was produced. Specifically, using a niobium powder for capacitors, an anode lead-attached porous anode body having a diniobium pentoxide-having dielectric oxide coating film formed on the surface thereof was produced. The capacitance (μF) at 120 Hz of the resultant porous anode body was measured using an LCR meter (E4980A, available from Agilent Corporation), and the capacitance in 20-mass % sulfuric acid of the porous anode body was 21.4 μF.

Example 1: Preparation of Liquid Dispersion Composition for Solid Electrolytic Capacitor Production (Dispersion ii-1)

As the compound (a1), 5.0 parts by mass of an ethanol solution of benzo[c]thiophene-1,3-dihydro-2-oxide (10 mass %) was added to 74.1 parts by mass of the above-mentioned dispersion (i-1), and further, 20.9 parts by mass of pure water was added thereto to give a liquid dispersion (ii-1) for solid electrolytic capacitor production.

Examples 2 to 7: Preparation of Liquid Dispersion Compositions for Solid Electrolytic Capacitor Production (Dispersions ii-2 to ii-7)

Liquid dispersions (ii-2) and (ii-3) of Examples 2 and 3 were produced by changing the amount to be used of the ethanol solution of the compound (a1) (10 mass %) from 5.0 parts by mass in Example 1 to 2.5 parts by mass and 1.0 part by mass, respectively, as in Table 1.

A liquid dispersion (ii-4) of Example 4 was produced using the same amount of benzo[c]thiophene-1,3-dihydro-2-oxide-sulfonic acid (compound (a2)) in place of the compound (a1).

A liquid dispersion of Example 5 was produced using an ethanol solution of the compound (a1) and the compound (a2) in an amount of 2.5 parts by mass each in place of 5.0 parts by mass of the ethanol solution of the compound (a1).

5.0 parts by mass of an ethanol solution of the compound (a1) (10% by mass) and 18.1 parts by mass of pure water were added to 76.9 parts by mass of the liquid dispersion (i-2) to produce a liquid dispersion composition (ii-6) of Example 6; and an ethanol solution of the compound (a1) and the compound (a2) in an amount of 2.5 parts by mass each was used to produce a liquid dispersion composition (ii-7).

Comparative Examples 1 to 2

From 74.1 parts by mass of the liquid dispersion (i-1) and 25.9 parts by mass of pure water, a liquid dispersion composition (ii-8) of Comparative Example 1 was produced; and from 74.1 parts by mass of the liquid dispersion (i-2) and 25.9 parts by mass of pure water, a liquid dispersion composition (ii-9) of Comparative Example 2 was produced.

[Step (C) and Step (D): Production and Evaluation of Solid Electrolytic Capacitor]

In air at 25° C., the porous anode body produced in the above-mentioned method was immersed in each liquid dispersion of (ii-1) to (ii-9), and then dried with a hot air drier (model; ST-110, available from ESPEC Corp.) at 120° C. for 30 minutes. This treatment was repeated four times. Next, a carbon paste was applied to the porous anode body so as not to be in contact with the anode lead terminal, and dried. Further, a silver paste was applied to an anode and a cathode for form contact points, then put on a lead frame and dried. The anode lead wire of this device was electrically connected to the anode lead part of a lead frame and sealed up with a resin, thereby producing a solid electrolytic capacitor device. The capacitance (μF) at 120 Hz of the resultant solid electrolytic capacitor device was measured with an LCR meter at n=4 to be an initial capacitance. Next, the device was left in a hot air drier at 130° C. for 250 hours, and thereafter the capacitance (μF) at 120 Hz was measured. The results are shown in Table 1.

Solid electrolytic capacitor devices produced and analyzed according to the same method as above, except that the drying treatment at 120° C. for 30 minutes was repeated 8 times, and the evaluation results thereof are shown in Table 1.

TABLE 1

| | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| *1 Formulation of Liquid Dispersion | Liquid Dispersion Composition | ii-1 | ii-2 | ii-3 | ii-4 | ii-5 | ii-6 | ii-7 | ii-8 | ii-9 |
| | Liquid Dispersion (i-1) | 74.1 (2.70) | 74.1 (2.70) | 74.1 (2.70) | 74.1 (2.70) | 74.1 (2.70) | 0.0 | 0.0 | 74.1 (2.70) | 0.0 |
| | Liquid Dispersion (i-2) | 0.0 | 0.0 | 0.0 | 0.0 | 0.0 | 76.9 (2.60) | 76.9 (2.60) | 0.0 | 74.1 |
| | Compound (a1)*2 | 5.0 (0.50) | 2.5 (0.25) | 1.0 (0.10) | 0.0 | 2.5 (0.25) | 5.0 (0.50) | 2.5 (0.25) | 0.0 | 0.0 |
| | Compound (a2)*3 | 0.0 | 0.0 | 0.0 | 5.0 (0.50) | 2.5 (0.25) | 0.0 | 2.5 (0.25) | 0.0 | 0.0 |
| | Pure Water | 20.9 | 23.4 | 24.9 | 20.9 | 20.9 | 18.1 | 18.1 | 25.9 | 25.9 |
| Results | Capacitance [μF] (drying treatment, 4 times) | 19.2 | 18.9 | 15.5 | 17.2 | 18.0 | 18.4 | 16.7 | 8.8 | 7.2 |
| | Capacitance [μF] (drying treatment, 8 times) | 21.5 | 21.6 | 20.8 | 21.0 | 20.7 | 21.1 | 20.9 | 16.8 | 15.6 |

*1 The numeral value in the columns of Formulation of Liquid Dispersion is part by mass (in the parentheses, the numeral value indicates a solid mass (g) of each component in the liquid dispersion composition).
*2a1: Benzo[c]thiophene-1,3-dihydro-2-oxide
*3a2: Benzo[c]thiophene-1,3-dihydro-2-oxide-sulfonic acid From comparison between Examples 1 to 7 and Comparative Examples 1 and 2 in Table 1, it is known that, by adding the compound (a), the capacitance greatly increased.

The capacitance of the solid electrolytic capacitor devices using the liquid dispersion composition for solid electrolytic capacitor production of Examples 1 to 7, to which at least one of benzo[c]thiophene-1,3-dihydro-2-oxide (compound (a1)) or benzo[c]thiophene-1,3-dihydro-2-oxide-sulfonic acid (compound (a2)) had been added, increased over the capacitance in Comparative Examples 1 and 2 not using the compound, and not limited thereto, the capacitor devices expressed the capacitance after a smaller number of treatments.

According to the present invention, solid electrolytic capacitors having an advanced performance can be realized with ease and the production process for such high-performance solid electrolytic capacitors can be simplified.

The invention claimed is:

1. A liquid dispersion composition for solid electrolytic capacitor production, comprising a conjugated conductive polymer, a dispersion medium, and a compound selected from the group consisting of benzo[c]thiophene-1,3-dihydro-2-oxide and benzo[c]thiophene-1,3-dihydro-2-oxide-sulfonic acid.

2. The liquid dispersion composition for solid electrolytic capacitor production according to claim 1, wherein the conjugated conductive polymer is a polymer of a monomer compound represented by a formula (2):

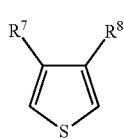

(2)

wherein $R^7$ and $R^8$ each independently represent a hydrogen atom, a hydroxy group, an alkyl group with 1 to 18 carbon atoms optionally having a substituent, an alkoxy group with 1 to 18 carbon atoms optionally having a substituent, or an alkylthio group with 1 to 18 carbon atoms optionally having a substituent, or $R^7$ and $R^8$ bond to each other to form an alicycle with 3 to 10 carbon atoms optionally having a substituent, an aromatic ring with 6 to 10 carbon atoms optionally having a substituent, an oxygen-containing hetero ring with 2 to 10 carbon atoms optionally having a substituent, a sulfur atom-containing hetero ring with 2 to 10 carbon atoms optionally having a substituent, or a sulfur atom and oxygen atom-containing hetero ring with 2 to 10 carbon atoms optionally having a substituent.

3. The liquid dispersion composition for solid electrolytic capacitor production according to claim 1, further comprising a polyanion.

* * * * *